United States Patent
Fowler

(10) Patent No.: US 8,616,589 B2
(45) Date of Patent: Dec. 31, 2013

(54) METHOD FOR ATTACHING TUBE AND FITTINGS

(75) Inventor: Warren Fowler, Springfield, TN (US)

(73) Assignee: Electrolux Home Products, Inc., Charlotte, NC (US)

( * ) Notice: Subject to any disclaimer, the term of this patent is extended or adjusted under 35 U.S.C. 154(b) by 292 days.

(21) Appl. No.: 12/685,326

(22) Filed: Jan. 11, 2010

(65) Prior Publication Data
US 2010/0176585 A1 Jul. 15, 2010

Related U.S. Application Data

(60) Provisional application No. 61/143,872, filed on Jan. 12, 2009.

(51) Int. Cl.
*F16L 25/00* (2006.01)

(52) U.S. Cl.
USPC .................................. 285/384; 285/334.5

(58) Field of Classification Search
USPC ............... 285/384, 354, 234, 392, 393, 353, 285/334.5
See application file for complete search history.

(56) References Cited

U.S. PATENT DOCUMENTS

| | | | |
|---|---|---|---|
| 2,354,460 A | 12/1940 | Hillis | |
| 3,294,425 A | 12/1966 | Franck | |
| 3,687,492 A | 8/1972 | Leopold et al. | |
| 3,930,298 A | 1/1976 | Ridenour | |
| 4,200,314 A | 4/1980 | Ridenour | |
| 4,516,796 A * | 5/1985 | Hudson | 423/578.4 |
| 5,332,161 A | 7/1994 | Schweitzer et al. | |
| 5,607,191 A * | 3/1997 | Wilson | 285/256 |
| 5,607,194 A | 3/1997 | Ridenour | |
| 5,727,303 A | 3/1998 | Ridenour | |
| 5,735,685 A | 4/1998 | Amaya-Orozco et al. | |
| 6,412,826 B1 * | 7/2002 | Kulevsky et al. | 285/305 |

FOREIGN PATENT DOCUMENTS

| | | |
|---|---|---|
| GB | 2045374 | 10/1980 |
| WO | 2004008013 | 1/2004 |

OTHER PUBLICATIONS

International Search Report for PCT/US2010/020690, mailed May 26, 2010, 2 pages.

* cited by examiner

*Primary Examiner* — Aaron Dunwoody
(74) *Attorney, Agent, or Firm* — Pearne & Gordon LLP

(57) ABSTRACT

A tube and fitting assembly can be used in a domestic appliance, such as an oven range, and includes a tube provided through an internal bore of a fitting. The tube includes a first end that is outwardly flared against a shoulder of the fitting via plastic deformation. The inner wall of the tube adjacent the outwardly flared portion is threaded and can be fastened to an orifice such that an internal bore of the orifice is in fluid communication with the tube.

3 Claims, 2 Drawing Sheets

METHOD FOR ATTACHING TUBE AND FITTINGS

RELATED APPLICATIONS

This application claims the benefit of U.S. Provisional Patent Application No. 61/143,872 filed on Jan. 12, 2009.

FIELD OF THE INVENTION

The subject application relates generally to kitchen ranges, and more particularly, to tube and fitting assemblies that can be used to provide flammable gas to kitchen ranges.

BACKGROUND OF THE INVENTION

Orifice assemblies, such as tube and fitting assemblies are often included in kitchen ranges for providing flammable gas. In particular, tube and fitting assemblies provide a fluid-tight seal to mitigate leakage of flammable gas. In conventional tube and fitting assemblies, the tube is longitudinally compressed inside the fitting to thereby radially expand the tube into contact with the fitting.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one example, a tube and fitting assembly for an oven range is provided, including a fitting with an internal bore extending through the fitting and a tube having a threaded portion and an end of the tube flared outwardly. A radial ring is removably secured to the threaded portion of the tube. A member having a thread for engaging with the threaded portion of the tube is also provided. The tube extends at least partially through the internal bore of the fitting.

In accordance with another example, a method of making a tube and fitting assembly for an oven range is provided. The method comprises the steps of providing a tube and installing a retaining ring on the tube. A fitting having an internal bore is also provided. The tube may be inserted into the internal bore of the fitting. In addition, the step of forming a threaded portion and flaring an end of the tube is provided, in addition to screwing a member onto the threaded portion of the tube.

In accordance with another example, a tube and fitting assembly for an oven range is provided with a fitting having an internal bore extending through the fitting. A thread tube having a threaded portion engages the fitting while an end of the tube may be flared outwardly against the fitting and radially expanded. A member having a thread for engaging with the thread of the tube is also included.

In accordance with another example, a method of making a tube and fitting assembly for an oven range is provided, comprising the steps of providing a tube, providing a fitting having an internal bore, and inserting the tube into the internal bore of the fitting. The tube can be radially expanded to form a flange and a threaded portion at an end of the tube. A member may be screwed onto the threaded portion of the tube.

BRIEF DESCRIPTION OF THE DRAWINGS

The foregoing and other aspects of the subject application will become apparent to those skilled in the art to which the subject application relates upon reading the following description with reference to the accompanying drawings.

DESCRIPTION OF EXAMPLE EMBODIMENTS

Figure 1:
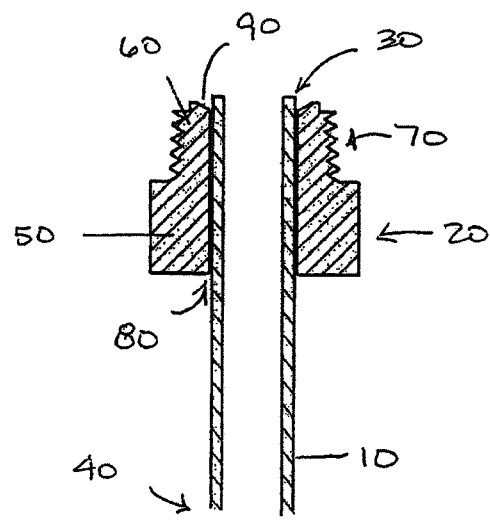
FIG. 1 illustrates a cross sectional view of a tube and fitting assembly in accordance with an example embodiment.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIGS. 1-4 illustrate a method of installing a fitting on a tube in accordance with an example embodiment. The tube and fitting assembly supports an orifice for use in household appliances, such as a gas range or cooktop. Because the orifice assembly is used to provide flammable gas (e.g., natural gas) to the range or cooktop, the assembly must provide a substantially fluid tight seal. Turning initially to FIG. 1, a cross sectional view of an initial stage of an example tube fitting assembly process is illustrated. A tube 10 is inserted into a fitting 20. The tube 10 is generally cylindrical with a first end 30 and a second end 40. The fitting 20 has a body 50, which can be cylindrical, and a tip portion 60 materially integral and positioned coaxially with the body 50. The tip portion 60 includes mounting threads 70 formed on its outer surface. The fitting 20 includes a bore 80 formed through the body 50 and the tip portion 60. A shoulder 90 is formed at the junction between the tip portion 60 and the bore 80. The shoulder 90 can be tapered inwardly, as shown in FIG. 1.

The tube 10 has an outer diameter that corresponds with an inner diameter of the fitting 20 such that the tube 10 can be positioned through the bore. The tube 10 is inserted in such a manner that the first end 30 of the tube 10 extends slightly past the shoulder 90 and the end of the tip portion 60.

Figure 2:
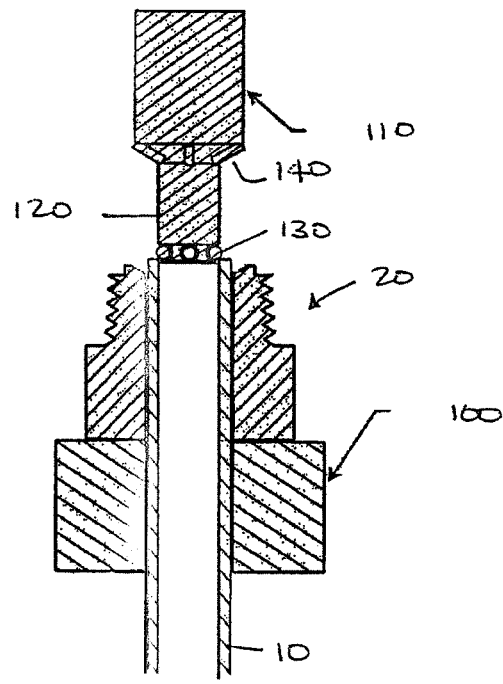
FIG. 2 illustrates a cross sectional view of a tube and fitting assembly prior to a radial compression operation in accordance with an example embodiment.

Turning now to FIG. 2, a holding structure 100 is provided to hold the tube 10 in position. The holding structure 100 is positioned below the body 50 of the fitting 20 and holds the tube 10 while a tool 110, such as an insertion tool, is inserted into the interior of the tube 10 at the first end 30 thereof. The tool 110 includes a cylindrical portion 120 configured to fit within the inner walls of the tube 10. The tool 110 is inserted into the tube 10 to radially expand the tube walls, thereby compressing the tube walls against corresponding walls of the fitting 20. Bearings 130 can be provided at an end portion of the tool 110 to facilitate insertion and movement of the tool 110 within the tube 10. The diameter of the tool 110 at the bearings portion is slightly larger than the inner diameter of the tube 10 to achieve radial expansion thereof. The tool 110 is also provided with a frusto-conical section 140 at the end of the cylindrical portion 120. The radial expansion effected by the cylindrical portion 120 of the tool 110 creates a tight engagement with the internal bore 80 of the fitting 20, securing the tube 10 within the fitting 20. When the cylindrical portion 120 of the tool is fully inserted into the tube 10, the frusto-conical section 140 makes contact with the first end 130 of the tube 10. Further insertion of the frusto-conical section 140 causes the first end 130 of the tube 10 to bow outward, creating a flared portion 150 (FIG. 3) of the tube 10 via plastic deformation. The tapered shoulder 90 of the fitting 20 supports the flared portion 150. The flared portion 150 may provide further support for the engagement between the tube walls and the internal bore 80 of the fitting 20.

Figure 3:
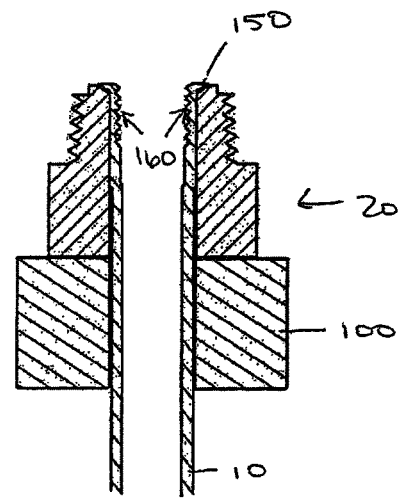
FIG. 3 illustrates a cross sectional view of a tube and fitting assembly after a threading operation in accordance with an example embodiment.
Figure 4:
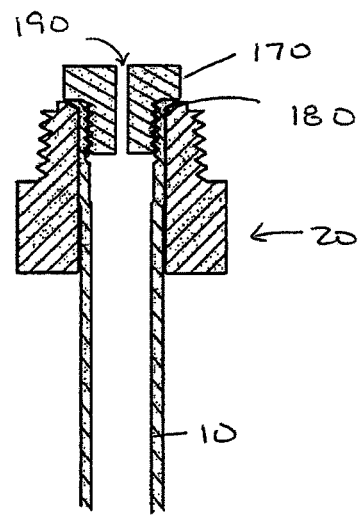
FIG. 4 illustrates a cross sectional view of a tube and fitting assembly after installation of a threaded member in accordance with an example embodiment.

As illustrated in FIG. 3, threads 160 are formed in the inner wall of the tube 10. The threads 160 can be formed by any conventional thread-forming method, such as thread cutting, roll forming, etc. Moreover, the threads 160 can be formed by the tool 110 or by a separate thread forming tool (not shown) once tool 110 is removed. Once the threads 160 are formed within the tube, a threaded member, such as an orifice, 170 can be installed, as shown in FIG. 4. The threaded member 170 has male threads 180 and an internal bore 190. The fit between the threaded member 170 and the tube 10 provides a fluid tight seal. The internal bore 190 of the threaded member 170 is in fluid communication with the inner diameter of the tube 10 to allow the passage of gas, fluid, etc, as desired. The threaded member 170 can also be configured with a shoulder portion to clamp down on the flange 150 of the tube 10 upon installation thereof.

Figure 5:
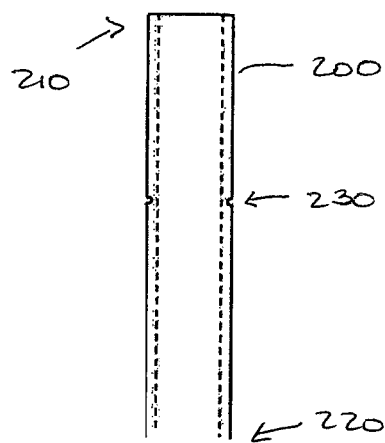
FIG. 5 illustrates a side view of a tube after a slot forming operation in accordance with an example embodiment.

Turning now to FIGS. 5-8, another example embodiment of installing a tube into a fitting is provided. FIG. 5 illustrates a tube 200 having a first end 210 and a second end 220. A groove or slot 230 is formed in an outer wall of the tube 200 and can be formed via any suitable method, such as by employing a grooving tool. The slot 230 extends around the circumference of the tube 200 but does not penetrate the inner wall.

Figure 6:
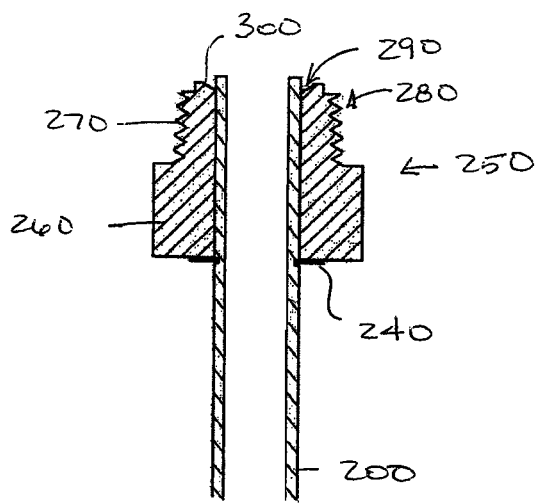
FIG. 6 illustrates a cross sectional view of a tube and fitting assembly in accordance with an example embodiment.

As shown in FIG. 6 a radial retaining ring 240 in fitted in the slot 230. A fitting 250 is provided over the first end 210 of the tube 200 and is supported in place by the retaining ring 240. The fitting 250 has a body 260, which can be cylindrical, and a tip portion 270 materially integral and positioned coaxially with the body 260. The tip portion 270 includes mounting threads 280 formed on its outer surface. The fitting 250 includes a bore 290 formed through the body 260 and the tip portion 270. A shoulder 300 is formed at the junction between the tip portion 270 and the bore 290. The shoulder 300 can be tapered inwardly, as shown in FIG. 5.

The tube 200 has an outer diameter that corresponds with an inner diameter of the fitting 250 such that the tube 200 can be positioned through the bore 290 of the fitting 250. The tube 200 is inserted in such a manner that the first end 210 of the tube 200 extends slightly past the shoulder 300 and the end of the tip portion 270 of the fitting 250 while the body 260 of the fitting 200 abuts the retaining ring 240. The retaining ring 240 may provide support for the fitting 250 by holding the tube 200 and fitting 250 in place and by limiting axial movement.

Figure 7:
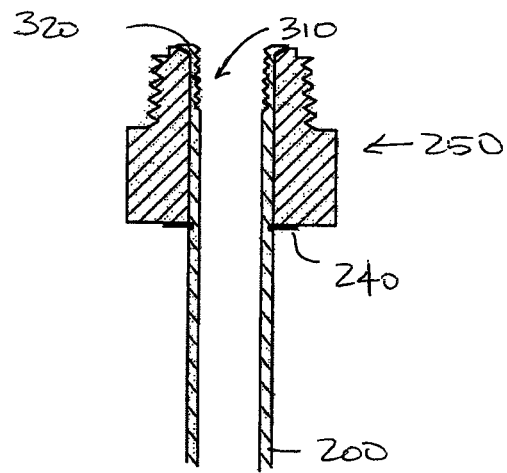
FIG. 7 illustrates a cross sectional view of a tube and fitting assembly after a thread forming operation in accordance with an example embodiment.

Once the fitting 250 is positioned on the tube 200 and is supported by the retaining ring 240, a tool (not shown), such as a roll forming tool, can be used to provide internal threads 310 in the tube. FIG. 7 illustrates the tube 200 and fitting 250 assembly after the threads 310 have been formed within the tube 200. It is to be appreciated that any tool capable of forming threads in the tube can be utilized and is contemplated as falling within the scope of the present invention. The tool can also include a frusto-conical or tapered portion capable of outwardly flaring the first end 210 of the tube 200 via plastic deformation, for example, against the shoulder 300 of the fitting 250. The flared portion may provide support for the engagement between the tube walls and the internal bore of the fitting by reducing axial movement.

Figure 8:
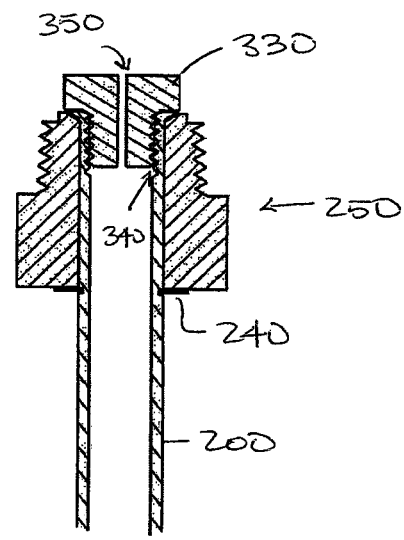
FIG. 8 illustrates a cross sectional view of a tube and fitting assembly after installation of a threaded member in accordance with an example embodiment.

FIG. 8 shows a threaded member 330, an orifice, for example, in connection with the tube 200 and fitting 250 assembly. The threaded member 330 includes a male threaded portion 340 and an internal bore 350. The male threaded portion 340 is adapted to be fit into the corresponding portion of the tube 200 to interact with the female threaded portion 310. The fit between the threaded member 330 and the tube 200 provides a substantially fluid tight seal. The internal bore 350 of the threaded member 330 is in fluid communication with the inner diameter of the tube 200 to allow the passage of gas, fluid, etc, as desired. The threaded member 330 can also be configured with a shoulder portion to clamp down on the flange 300 of the tube 200 upon connection therewith.

The tube and fitting assembly described herein can be used in an appliance, such as a gas range, in which the orifice directs flammable gas through it aperture in a vertical direction to form a pilot light burner for a gas appliance.

The invention has been described with reference to the example embodiments described above. Modifications and alterations will occur to others upon a reading and understanding of this specification. Examples embodiments incorporating one or more aspects of the invention are intended to include all such modifications and alterations.

The invention claimed is:

1. A tube and fitting assembly including:
   a tube having a first end, a second end, and a slot provided about a circumference thereof;
   a retaining ring provided in the slot; and
   a fitting provided over a portion of the tube and abutting the retaining ring, the fitting having a bore with a substantially uniform diameter extending through the fitting,
   wherein the first end of the tube is outwardly flared against a shoulder portion of the fitting, and
   wherein the inner diameter of the tube is larger at the first end than at the second end, the larger diameter creating a tight engagement of the tube with the internal bore of the fitting.

2. The tube and fitting assembly of claim 1, wherein the tube is provided with female threads at the first end adjacent the outwardly flared portion.

3. The tube and fitting assembly of claim 2, further comprising an orifice fastened to the female threads of the tube, the orifice having an internal bore in fluid communication with an internal portion of the tube.

* * * * *